United States Patent [19]

Johnson et al.

[11] Patent Number: 4,653,884
[45] Date of Patent: Mar. 31, 1987

[54] FOLDABLE CAMERA ACCESSORY FOR PHOTOGRAPHING ELECTRO-LUMINESCENT IMAGES

[75] Inventors: Bruce K. Johnson, Andover, Mass.; Robert M. Goward, Bow, N.H.

[73] Assignee: Polaroid Corporation, Cambridge, Mass.

[21] Appl. No.: 846,112

[22] Filed: Mar. 31, 1986

[51] Int. Cl.⁴ .................. G03B 11/04; G03B 29/00
[52] U.S. Cl. .................................. 354/81; 354/76; 346/110 R; 358/244; 355/39; 355/27
[58] Field of Search ............... 354/76, 81, 293, 187, 354/287; 355/20, 21, 27, 39, 40; 358/244; 346/110 R

[56] References Cited

U.S. PATENT DOCUMENTS

| | | | |
|---|---|---|---|
| 2,612,824 | 10/1952 | Kroemmelbein | 354/81 |
| 3,259,008 | 7/1966 | Buck | 358/244 |
| 3,295,425 | 1/1967 | Bing et al. | 355/21 |
| 3,396,649 | 8/1968 | Bishop et al. | 354/81 |
| 3,622,239 | 11/1971 | Miller | 355/39 |
| 3,696,720 | 10/1972 | Vinson | 354/76 |
| 3,709,119 | 1/1973 | VanDerMeer | 354/81 |
| 3,918,810 | 11/1975 | Cohen | 354/76 |
| 4,222,654 | 9/1980 | Bodenhamer | 354/293 |
| 4,508,440 | 4/1985 | Costa et al. | 354/187 |
| 4,526,444 | 7/1985 | Fantone et al. | 350/501 |
| 4,542,967 | 9/1985 | Costa et al. | 354/187 |
| 4,556,914 | 12/1985 | Vitek et al. | 358/244 |

Primary Examiner—A. A. Mathews
Attorney, Agent, or Firm—David R. Thornton

[57] ABSTRACT

A foldable hood accessory to which a camera may be mounted for photographing electro-luminescent images presented on a reflective surface, the hood including an assembly of upper and lower hood panels pivotally connected to each other at one end and closed along diverging side edges by flexible side shields. The connected hood panels are supported from a plate-like camera mounting base through a pivotal bail and by pivotal connection to a copy lens mount which, in turn is pivoted generally centrally of the base. The pivotal connection of components in the overall assembly permit the hood accessory to be conditioned in a very compact folded form or in an erected form to present a forwardly diverging light shielding hood with a mounting platform at the rear end thereof and to which a camera may be mounted.

7 Claims, 8 Drawing Figures

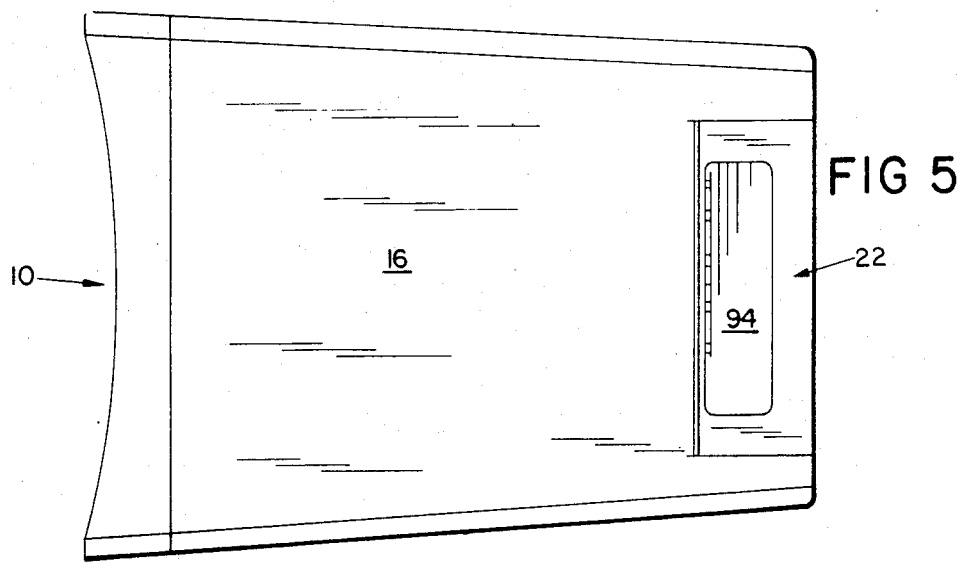
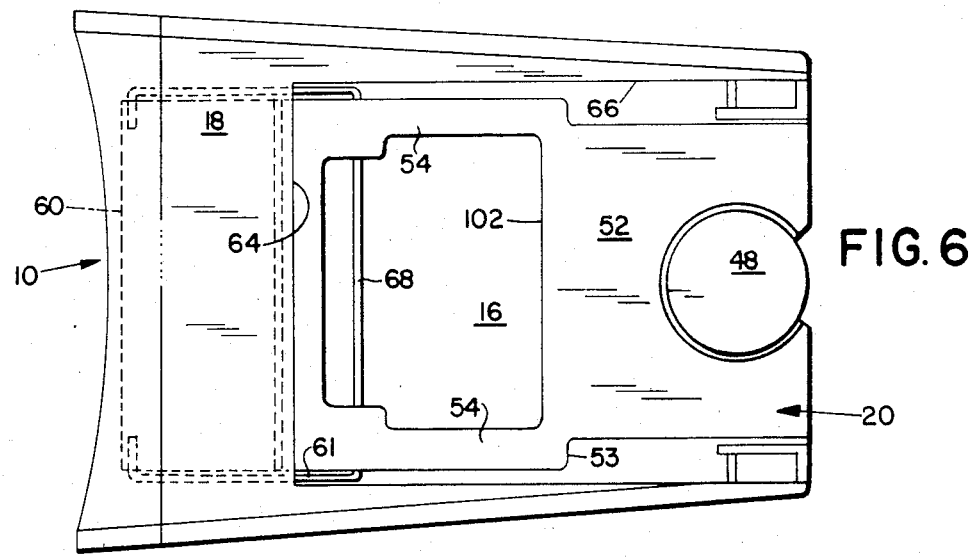
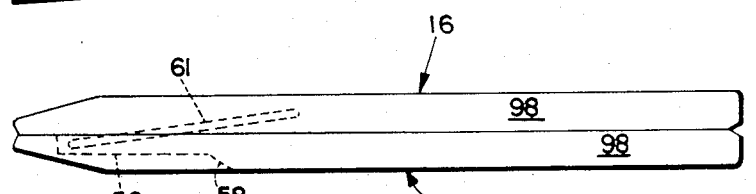
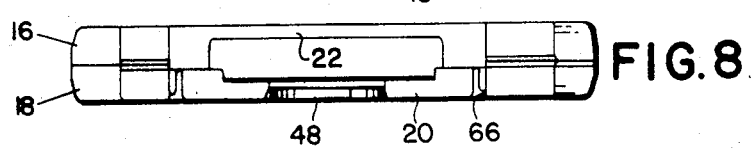

4,653,884

FOLDABLE CAMERA ACCESSORY FOR PHOTOGRAPHING ELECTRO-LUMINESCENT IMAGES

BACKGROUND OF THE INVENTION

This invention relates to photographic accessories, and more particularly, it concerns a foldable hood accessory on which a camera may be mounted to facilitate photographing electro-luminescent images of a type displayed on the face of a cathode ray tube (CRT), for example.

With increased availability and popularity of electronic imaging equipment in recent years, both in home entertainment and in industrial applications, a corresponding increased demand has arisen for equipment capable of providing high quality photographic reproductions of electronically displayed images. Electroluminescent imaging devices such as CRT's, gaseous display panels, LED matrices and the like are difficult to photograph using conventional cameras principally because ambient light or other reflected illumination reduces contrast in the resulting photograph. In addition, the electro-luminescent image is most commonly displayed through a glass or otherwise highly reflective surface, thus giving rise to unwanted glare by reflection of ambient or other outside illumination.

Another problem encountered in the taking of a photograph of an electro-luminescent image of the type displayed by CRT, for example, is that the size of the image requires placement of the camera within relatively close and thus critical focusing distances of the CRT image. At such distances, conventional camera lenses lack necessary flatness of field to assure accurate focusing of the entire CRT image. As a result, provision must be made to ensure accurate positioning of the camera relative to the electro-luminescent image and additionally, auxillary lenses are needed if the photographic reproduction is to be consistently of high quality.

SUMMARY OF THE PRESENT INVENTION

In accordance with the present invention, the problems associated with producing high quality photographs of an electro-luminescent image of the type presented by a CRT, for example, are substantially overcome through the provision of a foldable hood accessory to which a conventional camera may be fixed for optically precise positioning with respect to an auxillary lens carried by the hood, for positioning the camera at a precisely fixed distance from the electroluminescent image and for shielding the image from unwanted ambient light which may be reflected from the screen on which the electro-luminescent image is presented.

The hood is embodied in an assembly of upper and lower hood panels pivotally connected to each other at one end and closed along diverging side edges by bellows-like flexible side shields. The connected panels are supported from a plate-like camera mounting base through a pivotable bail and by pivotal connection to a copy lens mount which, in turn, is pivoted from the base. The pivotal connection of components in the overall assembly permit the hood accessory to be erected from a very compact, plate-form geometry simply by pivoting the copy lens mount to an erect position. Such movement of the copy lens mount causes the panels to assume a forwardly diverging conformation capable of placement against a CRT screen or other surface at which an electro-luminescent image is presented. In the erect condition of the hood accessory, a camera may be mounted and positioned using a conventional tripod mounting clamp carried by the base plate.

Among the objects of the invention, therefore, are the provision of a foldable hood accessory for adapting a camera to photograph an electro-luminescent image presented on a CRT screen, for example; the provision of such a hood accessory which both shields an image screen from ambient light and positions a camera relative to the screen; and the provision of such a hood accessory which enables complete operation of a camera mounted thereon, including film loading and discharge of exposed film units from the camera.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 5 is a top plan view of the hood accessory in a folded condition;

FIG. 6 is a bottom plan view of the folded hood;

FIG. 7 is a side elevation of the folded hood accessory; and

FIG. 8 is an end elevation of the folded hood accessory of the invention.

DETAILED DESCRIPTION OF THE PREFERRED EMBODIMENT

Figure 1:
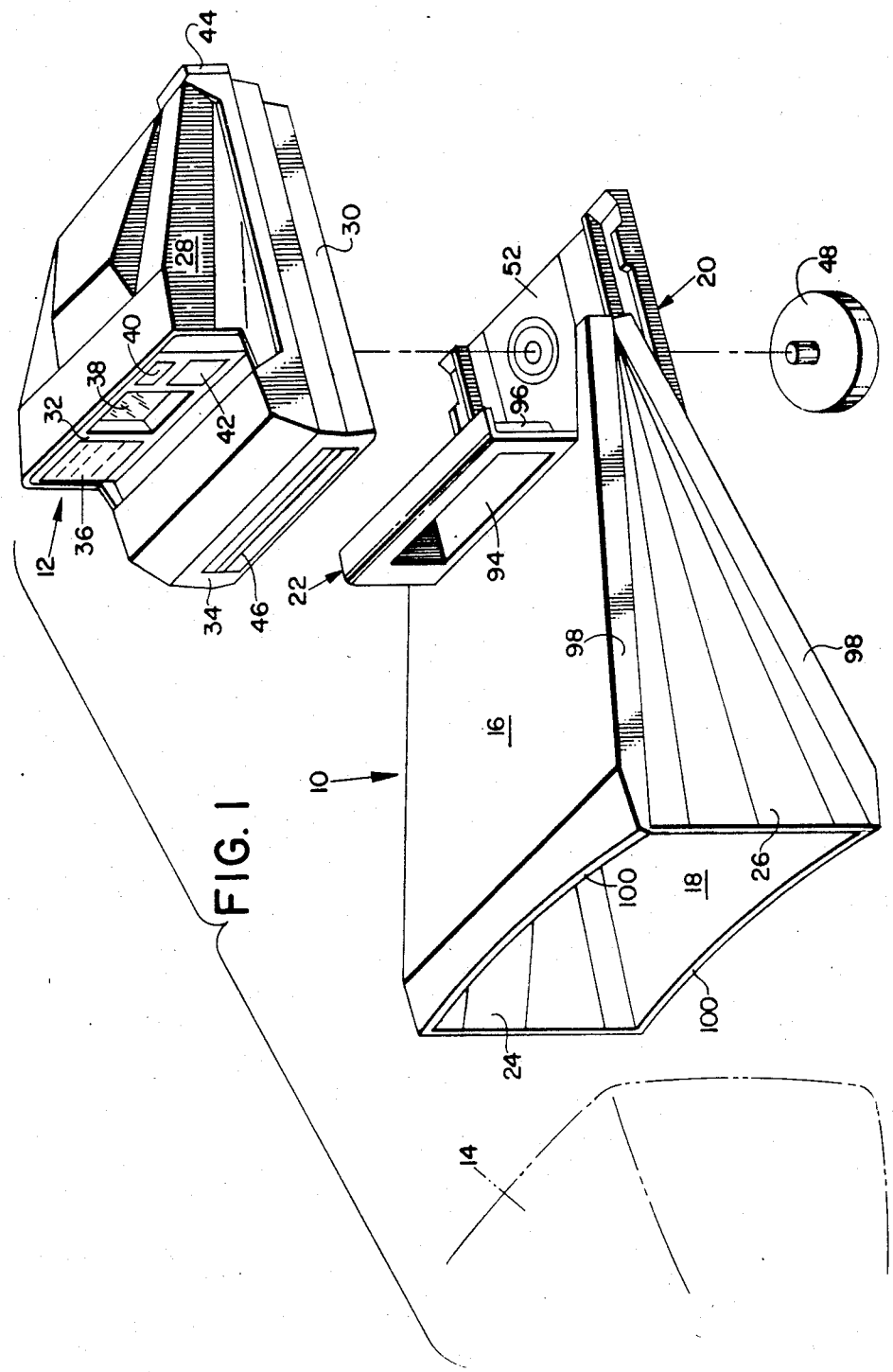
FIG. 1 is an exploded perspective view illustrating the assembly of a camera with the foldable hood accessory of the present invention.

In FIG. 1 of the drawings, the hood accessory of the present invention is generally designated by the reference numeral 10 and is intended to be used with a camera 12 to photograph an electro-luminescent display as might be presented, for example, on the front face or screw of a cathode ray tube 14. Although the structural features of the foldable hood 10 will be described in more detail below, it may be seen in FIG. 1 that the hood 10 includes an upper hood panel 16, a lower hood panel 18, a camera mounting base 20 and a copy lens mount 22. The sides of the upper and lower hood panels 16 and 18 are interconnected by foldable or bellows-like side shields 24 and 26 to present a generally rectangular opening at the front of the erected hood accessory 10 to complement the display screen on the front of the CRT 14 or other electroluminescent image display device with which the accessory might be used.

Although the hood accessory 10 is adaptable with minor variations to accommodate a wide variety of different camera configurations, the embodiment of the hood 10 illustrated in the drawings is intended principally for use with instant cameras of a type disclosed fully in U.S. Pat. Nos. 4,508,440, 4,526,444 and 4,542,967, all of which are owned by the assignee of the present invention. The disclosures of these patents are incorporated herein by reference to the extent that information about the camera 12 more detailed than is apparent from the illustration in FIG. 1 is needed to practice the invention. As may be seen in FIG. 1, the camera 12 includes foldable upper and lower body sections 28 and 30, respectively, the upper body section having a front face 32 presented above and to the rear of the front wall 34 of the bottom housing 30 when the camera is erected or in the condition illustrated in FIG. 1. Major operating components presented from the face 32 of the upper body section 28 include a sonar range finding transducer 36, an objective lens 38, a photocell window 40 and a viewfinder lens 42. The optical path of light entering the viewfinder lens 42 is fully described in U.S. Pat. No. 4,526,444 and normally presents a framing image of a scene to be photographed at a viewfinder eyepiece 44 at the rear end of the camera. The lower body section 30 is adapted to be loaded with a pack of self-developing film units through a loading door 46 at the front end 34 of the lower base section and also, film units contained in the loaded pack, after exposure, are discharged through the front end 34 of the camera in a known manner. The lower body section further includes a tripod mounting socket (not shown) and into which a clamping screw 48, normally secured to the camera mounting base 20, may be fitted to secure the camera in position on the hood accessory 10.

Figure 2:
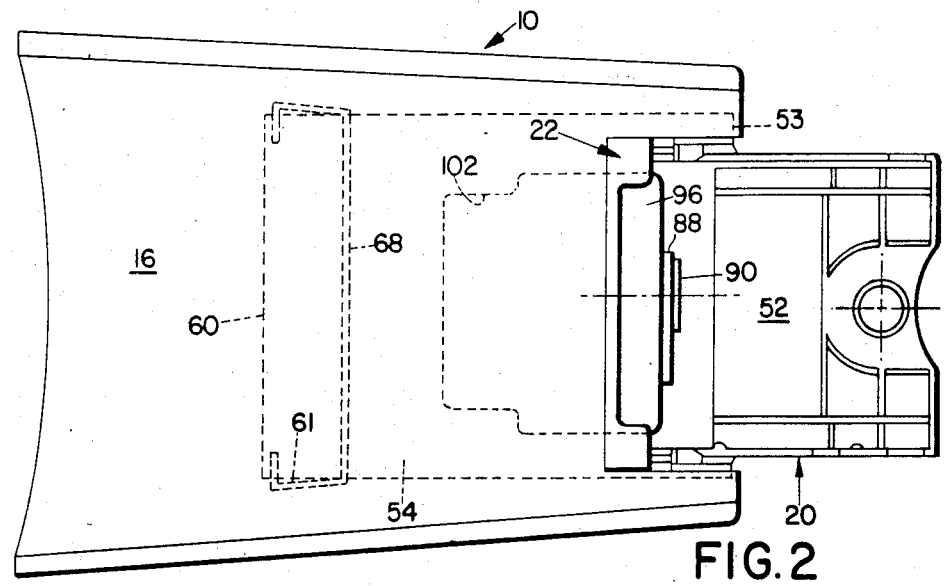
FIG. 2 is a top plan view of the erected hood accessory.
Figure 3:
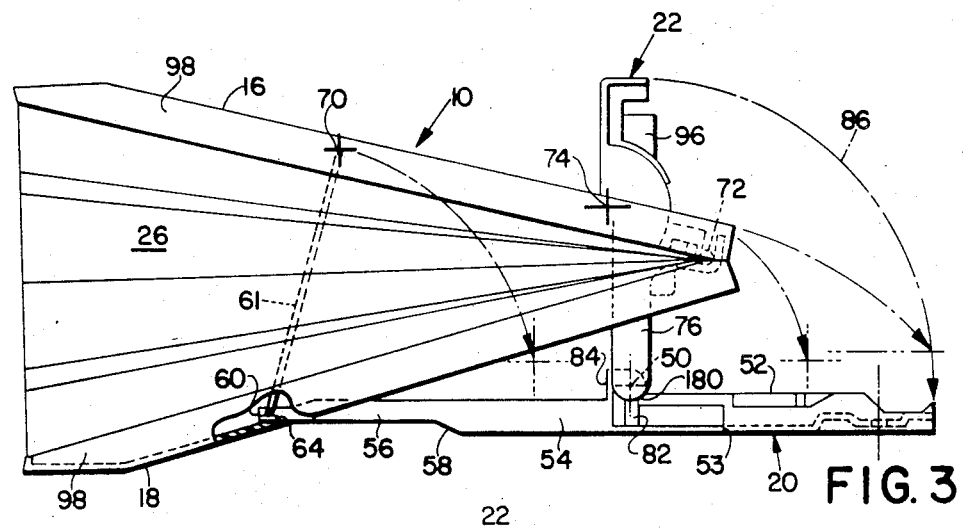
FIG. 3 is a side elevation of the hood accessory in an erected condition.
Figure 4:
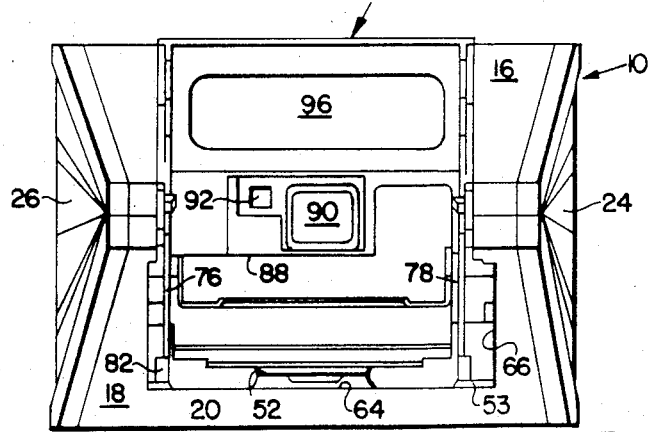
FIG. 4 is a rear elevation of the erected hood accessory.

Structural components of the hood accessory 10, in addition to the components described above with reference to FIG. 1, are most clearly illustrated in FIGS. 2-4 of the drawings in which the accessory 10 is again illustrated in its erect or operative condition. In FIGS. 2 and 3, it will be noted that the copy lens mount 22 is pivotally connected to the mounting base 20 on an axis 50 located generally intermediate the ends of the mounting base 20. As may be seen in FIG. 2, the major portion of the mounting base 20 extending rearwardly of the axis 50 may be characterized as a camera mounting platform 52 in which the clamping screw 48 is received. The front section of the base 20 projects forwardly of the platform 52 from a rear edge 53 as a rectangular plate which is slightly wider than the camera mounting platform 52. The front plate portion 54 of the mounting base 20 is further characterized as having a front nose section 56 of reduced thickness forwardly of a chamfer 58 and terminating in a front edge 60. A generally U-shaped wire bail 61 is pivotally secured to the nose portion 56 on an axis 62 spaced slightly from the front edge 60. Also it may be seen in FIG. 3 (see also FIGS. 4 and 6), that in the erected condition of the hood 10, the lower surface of the nose portion 56 under the axis 62 overlies a rearwardly facing edge 64 in the lower hood panel 18, the edge 64 being defined by the front of a rectangular cutout 66 extending from the edge 64 to the rear of the lower hood panel 18. The closed side 68 of the bail 61 is pivotally secured to the upper hood panel 16 on an axis 70. The upper and lower hood panels are pivotally interconnected to each other at the rear ends thereof by pintels 72 and the upper hood panel 16 is further pivotally connected to the copy lens mount 22 on an axis 74. Thus it will be appreciated that in the erected condition of the hood 10, the bail 61 operates as a strut to retain the upper panel 16 spaced from the front section 54 of the base 20 and, because of the overlying relationship of the nose portion 56 with respect to the edge 64 in the lower hood panel 18, maintains divergent separation of the upper panel 16 relative to the lower panel 18.

Details of the copy lens mount 22 are illustrated most clearly in FIGS. 3-5 of the drawings. As mentioned previously, the mount 22 is pivotally connected to the base 22 on the axis 50 and to this end, the mount 22 includes a pair of strap-like legs 76 and 78 spaced to lie outside of the width of the camera mounting platform 52. The semicircular lower ends of the legs 76 and 78 are formed with detent notches 80 (FIG. 3) which cooperate with detents 82 supported at the rear edge of the front plate portion 54 of the mounting base 20, slightly rearward of vertical wall formations 84. In light of this arrangement, it will be appreciated that the copy lens mount 22 may be pivoted from the vertical position shown in FIG. 3, through an arc represented by the dashed arrow 86 into a collapsed position nested against the top of the camera mounting platform 52. Upon erecting the mount 22, its ultimate position will be fixed by abutment of the legs 76 and 78 with the vertical wall formations 84 and retained by the detent 82.

As may be seen most clearly in FIG. 4, the copy lens mount 22 supports at approximately midway along its length (height), a lens board 88 in which is supported a copy lens 90 and a photocell aperture 92. The lens 90 and aperture 92, in the illustrated embodiment, are positioned for respective alignment with the objective lens 38 and photocell window 40 of the camera 12 described above with reference to FIG. 1. Also in this context, lens board 88 is shaped to leave unobstructed or open, the space forwardly of the range finding transducer 36 of the camera 12 when the latter is mounted on the platform 52. On the other hand, the lens board 88 blocks the viewfinder lens 42 of the camera to effectively inhibit use of the viewfinder during operation to copy an electro-luminescent image on a CRT screen, for example. Alternatively, the lens board 88 could have an opening for the viewfinder lens 42 provided such an opening included a wedge or equivalent to correct for parallax. It will be understood from the described operation of the device to follow that the viewfinder of the camera 12 is not needed to properly frame a CRT screen image or its equivalent. Also in this connection, use of the hood accessory 10 with a single lens reflex camera of the general configuration of the camera 12 would permit visual framing of the CRT screen image.

Positioned in the copy lens mount 22 above the lens board 88 is a carrying handle well 94 (FIGS. 1 and 5). The well 94 functions to facilitate carrying the folded lens hood 10 as will be described with reference with FIGS. 5-7 but its accommodation results in a generally rectangular boss 96 projecting rearwardly from the upper portion of the copy lens mount 22.

The upper and lower hood panels 16 and 18, though generally flat, are provided with side edges 98 to establish the panels 16 and 18 as complementing half-shell enclosures when the hood 10 is collapsed to its folded condition illustrated in FIGS. 5-8 of the drawings. Also, the front edges of the panels 16 and 18 are defined as curved or otherwise shaped lips 100 to complement the surface of a CRT screen or other surface on which a electro-luminescent image is displayed for photographic copying using the hood 10. The lips 100 may be equipped with black felt or other cushioning and light sealing material (not shown).

To collapse the erected lens hood from the condition illustrated in FIGS. 1-4 to the folded condition illustrated in FIGS. 5-8, the copy lens mount 22 is simply pivoted from its erect position, as shown in FIG. 3, through the path indicated by the dashed arrow 86 to nest against the upper surface of the camera mounting platform 52. In so moving the lens mount 22, the upper hood panel 16 is carried by the pivotal connection 74 and the bail 61 so that the rear edge of the upper panel (and thus also the rear edge of the pivotally connected lower panel 18), moves to a flush position along the rear edge of the platform 52 and of the top or rear edge of the lens mount 22 as shown in FIG. 5. As this movement occurs, the front portion of the lower hood panel 18, specifically the edge 64, will ride along the lower edge of the nose portion 56 of the base 20 to the chamfer 58. The flexible bellows-like panels 26 and 28 will be received within the clam shell enclosure of the upper and lower hood panels 16 and 18 and the hood arranged in the neat compactly folded condition illustrated in FIGS. 5-8. Also in this condition, the handle well 94 facilitates manipulation and carrying of the folded hood 10.

In use, the hood 10 is erected simply by pivoting the copy lens mount 22 up to the erected condition shown in FIGS. 2-3 and the camera 12 mounted in place using the clamping screw 48. When the camera is so mounted, the front wall portion 34 of the lower camera body section 30 will underlie the lens board 88 of the mount 22. Also it is to be noted that the film pack loading door 46 will be positioned to the rear of a relatively large, generally T-shaped opening 102 in the plate portion 54 of the mounting base 20. The opening 102 is adequately sized for loading a film pack into the mounted camera 12 and also will facilitate the manipulation of an exposed film unit discharged from the front end of the mounted camera.

To expose a film unit to an image presented on the screen of the CRT 14, for example, the assembly of the camera and the erected hood 10 is positioned relative to the CRT display merely by placing the lips 100 of the upper and lower hood panels 16 and 18 directly against the screen. As a result, ambient light will be prevented from reflection from the CRT screen but equally as important, the distance between the screen and the camera lens 38 will be fixed. Also, the automatic flash system of the camera 12 is disabled. Upon operation of the camera 12 to make an exposure of the CRT screen image, the camera contained range finder operated by information generated by the transducer 36 will automatically focus the lens 38 to a close-up distance. To the extent that such focusing of the lens 38 is not adequate for the short distance between the camera objective 38 and the screen of the CRT 14, the copy lens 90 is designed to correct any such inadequacy. The time interval and other parameters of film exposure will be controlled by the automatic exposure control mechanism, again contained within the camera and responsive to light passing through the photocell window 40.

Thus it will be appreciated that as a result of the present invention, a highly effective foldable hood is provided for adapting a photographic camera to photograph an electro-luminescent CRT screen image. As indicated, modifications in the illustrated embodiment may be made to accommodate variations of camera geometry. It will be apparent to those skilled in the art from the disclosure that additional modifications and/or changes may be made in the illustrated embodiment without departure from the invention. Accordingly, it is expressly intended that the illustrated embodiments are illustrative only, and that the true spirit and scope of the present invention will be determined by reference to the appended claims.

We claim:

1. A hood accessory for mounting a camera in position to photograph electro-luminescent images presented on a reflective surface, said accessory comprising:
   a plate-like base having front and rear ends and including a camera mounting platform extending forwardly from said rear end;
   a copy lens mount pivotally connected to said base forwardly of said mounting platform and movable between a collapsed position against said platform and an erect position upstanding from said base;
   upper and lower hood panels each having front and rear ends and being pivotally connected to each other at said rear ends;
   means pivotally connecting said upper panel to said copy lens mount; and
   means including pivotal strut means connected between the front end of said base and said upper hood panel for retaining said upper hood panel in spaced relation from said lower hood panel and said base when said copy lens mount is in said erect position.

2. The hood accessory recited in claim 1, wherein said lower hood panel is formed having a cut-out defining a rearwardly facing edge spaced from the front edge of said lower hood panel, said base generally underlying said cut-out but extending therethrough so that the front end of said base overlies said rearwardly facing edge.

3. The hood accessory recited in claim 2, wherein said pivotal strut means comprises a U-shaped bail pivotally connected to said front end of said base.

4. The hood accessory recited in claim 1, wherein said base defines a film loading and discharge opening located forwardly of said camera mounting platform.

5. The hood accessory recited in claim 1, including a copy lens supported by said copy lens mount to be positioned in front of the objective lens of a camera secured to said mounting platform.

6. The hood accessory recited in claim 5, wherein said copy lens mount includes a photocell window and an acoustic transducer opening to be respectively aligned with the photocell window and acoustic transducer of a camera mounted on said platform.

7. The hood assembly recited in claim 1, wherein said copy lens mount includes a handle well for gripping and carrying the hood accessory in a folded condition.

* * * * *